United States Patent
Chen et al.

(10) Patent No.: US 9,305,364 B2
(45) Date of Patent: Apr. 5, 2016

(54) MOTION ESTIMATION SYSTEMS AND METHODS

(71) Applicant: Caterpillar Inc., Peoria, IL (US)

(72) Inventors: Qi Chen, Dunlap, IL (US); Paul Russell Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 93 days.

(21) Appl. No.: 13/770,476

(22) Filed: Feb. 19, 2013

(65) Prior Publication Data

US 2014/0233790 A1    Aug. 21, 2014

(51) Int. Cl.
| | | |
|---|---|---|
| G06T 7/20 | (2006.01) | |
| G01B 11/00 | (2006.01) | |
| G01S 17/02 | (2006.01) | |
| G01S 17/42 | (2006.01) | |
| G01S 17/89 | (2006.01) | |
| G01S 7/48 | (2006.01) | |
| G01S 15/89 | (2006.01) | |

(52) U.S. Cl.
CPC .............. *G06T 7/204* (2013.01); *G01S 7/4808* (2013.01); *G01S 17/023* (2013.01); *G01S 17/42* (2013.01); *G01S 17/89* (2013.01); *G01S 15/89* (2013.01); *G06T 2207/10016* (2013.01); *G06T 2207/10028* (2013.01)

(58) Field of Classification Search
CPC ................... G06T 2207/10016; G06T 7/2033; G06T 7/20; G06K 9/3241; G06K 9/00771
USPC .......... 382/103, 154, 106, 206; 345/154, 582; 356/5.01, 601; 340/154
See application file for complete search history.

(56) References Cited

U.S. PATENT DOCUMENTS 6,771,840 B1 * 8/2004 Ioannou et al. ............... 382/285
7,336,805 B2 2/2008 Gehring et al.
(Continued)

FOREIGN PATENT DOCUMENTS

| GB | 201116959 D0 | * 11/2011 | .................... 356/4.01 |
|---|---|---|---|
| WO | WO2011/146523 | 11/2011 | |

OTHER PUBLICATIONS

Motion Segmentation and Scene Classification from 3D LIDAR Data; Dominik Steinhauser, . . . ; 2008 IEEE Intelligent Vehicles Symposium; Eindhoven Univerisity of Technology; Eindhoven, The Netherlands, Jun. 4-6, 2008 Technische University Munchen, Munich, Germany.*

(Continued)

*Primary Examiner* — Stephen R Koziol
*Assistant Examiner* — Pinalben Patel
(74) *Attorney, Agent, or Firm* — Finnegan, Henderson, Farabow, Garrett & Dunner, LLP

(57) ABSTRACT

A motion estimation system is disclosed. The motion estimation system may include one or more memories storing instructions, and one or more processors configured to execute the instructions to receive, from a scanning device, scan data representing at least one object obtained by a scan over at least one of the plurality of sub-scanning regions, and generate, from the scan data, a sub-pointcloud for one of the sub-scanning regions. The sub-pointcloud includes a plurality of surface points of the at least one object in the sub-scanning region. The one or more processors may be further configured to execute the instructions to estimate the motion of the machine relative to the at least one object by comparing the sub-pointcloud with a reference sub-pointcloud.

18 Claims, 4 Drawing Sheets

(56) References Cited

U.S. PATENT DOCUMENTS

| | | | |
|---|---|---|---|
| 7,643,966 B2* | 1/2010 | Adachi et al. | 703/1 |
| 7,728,833 B2 | 6/2010 | Verma et al. | |
| 8,208,689 B2 | 6/2012 | Savolainen et al. | |
| 8,340,400 B2* | 12/2012 | Lukas et al. | 382/154 |
| 8,473,144 B1 | 6/2013 | Dolgov et al. | 701/28 |
| 8,805,015 B2* | 8/2014 | Chang et al. | 382/103 |
| 2003/0067461 A1* | 4/2003 | Fletcher et al. | 345/420 |
| 2009/0232355 A1* | 9/2009 | Minear et al. | 382/103 |
| 2009/0262974 A1 | 10/2009 | Lithopoulos | |
| 2010/0074473 A1* | 3/2010 | Kotaba | 382/106 |
| 2010/0121577 A1* | 5/2010 | Zhang et al. | 701/301 |
| 2010/0302247 A1* | 12/2010 | Perez et al. | 345/440 |
| 2011/0200248 A1* | 8/2011 | Matabosch I Gerones et al. | 382/154 |
| 2011/0205338 A1* | 8/2011 | Choi et al. | 348/46 |
| 2011/0274343 A1* | 11/2011 | Krishnaswamy et al. | 382/154 |
| 2012/0121132 A1* | 5/2012 | Asahara et al. | 382/103 |
| 2013/0156262 A1* | 6/2013 | Taguchi et al. | 382/103 |
| 2013/0179119 A1* | 7/2013 | Coddington et al. | 702/159 |
| 2014/0016821 A1* | 1/2014 | Arth et al. | 382/103 |
| 2014/0233010 A1* | 8/2014 | Baldwin et al. | 356/4.01 |

OTHER PUBLICATIONS

Ernesto Homar, Registration of 3-D Points Clouds For Urban Robot Mappings, IRI, 2008.*

* cited by examiner

MOTION ESTIMATION SYSTEMS AND METHODS

TECHNICAL FIELD

The present disclosure relates generally to systems and methods for motion estimation, more specifically, to systems and methods for motion estimation by using pointclouds.

BACKGROUND

Autonomously controlled and/or semi-autonomously controlled machines are capable of operating with little or no human input by relying on information received from various machine systems. For example, a machine guidance system may detect a location and movement of the machine based on inputs received about the machine's environment and may then control future movements of the machine based on the detected location and movement. In order to effectively guide the machine, however, it may be desirable to ensure that the location and movement of the machine are being detected and updated with a frequency high enough to ensure proper machine operation.

U.S. Pat. No. 7,336,805 to Gehring et al. that was issued on Feb. 26, 2008 ("the '805 patent") discloses an exemplary guidance system for a motor vehicle. Specifically, the system acquires image data of a surrounding field of the motor vehicle by using an imaging sensor. The system them extracts positional parameters of at least one potential destination relative to the motor vehicle from the acquired image data. Based on the extracted positional parameters, the system calculates an optimized travel path, so as to assist a subsequent vehicle guidance for the at least one potential destination.

Although the system of the '805 patent may be useful in guiding a motor vehicle along an optimized travel path, the system of the '805 patent calculates the travel path based on the image data of the entire surrounding field of the motor vehicle. Due to the large size of the image data, the calculation may unnecessarily consume large amounts of computing resources. As a result, the system of the '805 patent may not provide and update the optimized travel path with a high enough frequency.

The motion estimation system of the present disclosure is directed toward solving the problem set forth above and/or other problems of the prior art.

SUMMARY

In one aspect, the present disclosure is directed to a motion estimation system. The motion estimation system may include one or more memories storing instructions, and one or more processors configured to execute the instructions to receive, from a scanning device, scan data representing at least one object obtained by a scan over at least one of the plurality of sub-scanning regions, and generate, from the scan data, a sub-pointcloud for one of the sub-scanning regions. The sub-pointcloud includes a plurality of surface points of the at least one object in the sub-scanning region. The one or more processors may be further configured to execute the instructions to estimate the motion of the machine relative to the at least one object by comparing the sub-pointcloud with a reference sub-pointcloud.

In another aspect, the present disclosure is directed to a computer-implemented method of estimating a motion of a machine. The method may include dividing a full scanning region into a plurality of sub-scanning regions. The method may also include receiving, from a scanning device, scan data representing at least one object obtained by a scan over at least one of the plurality of sub-scanning regions. The method may further include generating, by a processor, a sub-pointcloud from the scan data for one of the sub-scanning regions. The sub-pointcloud may include a plurality of surface points of the at least one object in the sub-scanning region. The method may still further include estimating, by the processor, the motion of the machine relative to the at least one object by comparing the sub-pointcloud with a reference sub-pointcloud.

In still another aspect, the present disclosure is directed to a system for motion estimation. The system may include a scanning device capable of being mounted on a machine and configured to scan at least one object over a sub-scanning region among a plurality of sub-scanning regions of a full scanning region and generate a sub-pointcloud of the sub-scanning region. The sub-pointcloud may include a plurality of surface points of the at least one object in the sub-scanning region. The system may also include a controller configured to estimate a motion of the machine relative to the at least one object by comparing the sub-pointcloud with a corresponding reference sub-pointcloud.

DETAILED DESCRIPTION

Figure 1:
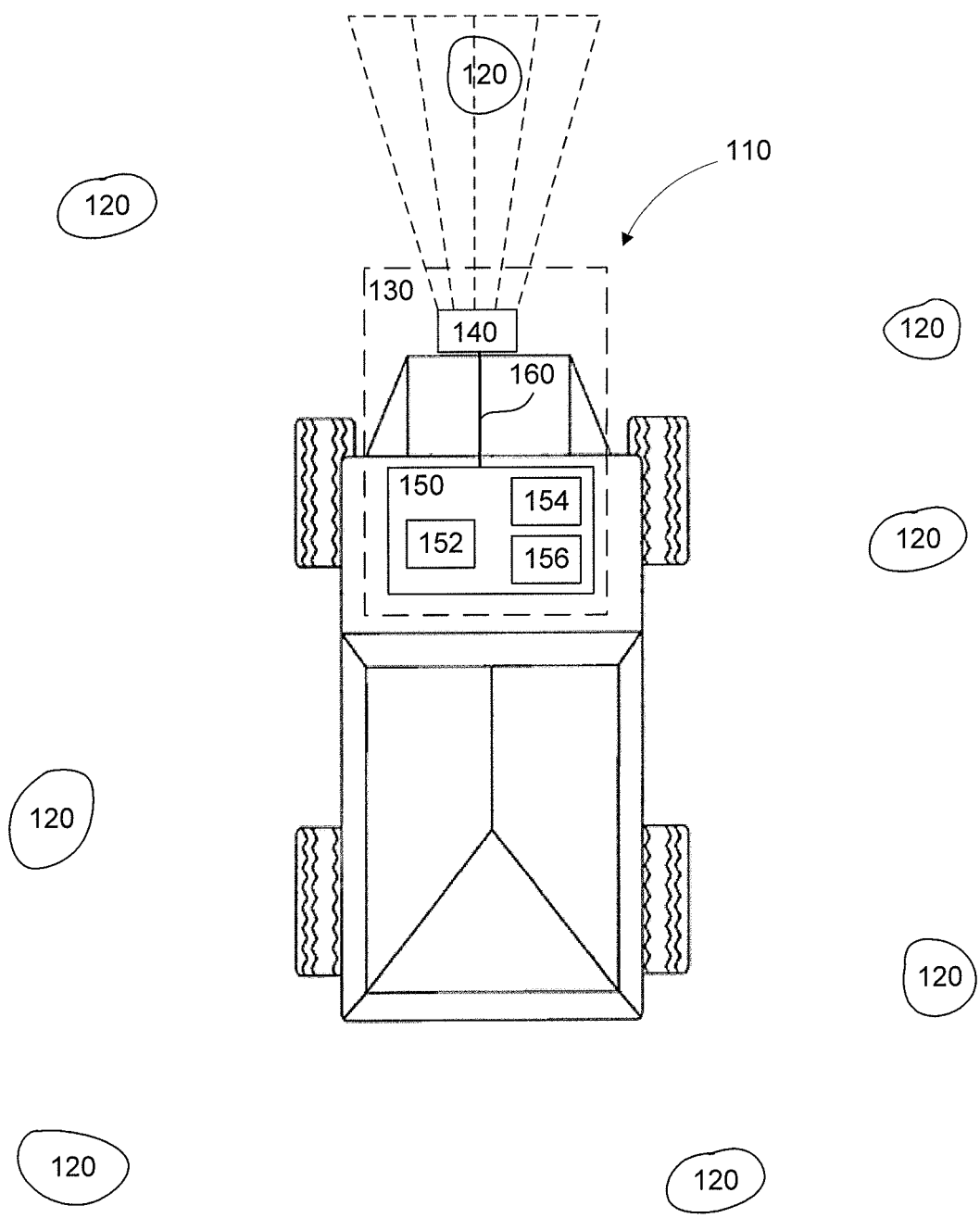
FIG. 1 is a schematic illustration of a work site and an exemplary machine consistent with certain disclosed embodiments.

FIG. 1 illustrates an environment 100 and an exemplary machine 110 performing a task at environment 100. Environment 100 may be a worksite such as, for example, a mine site, a landfill, a quarry, a construction site, or any other type of environment. Environment 100 may also be an exploration site in a location that might be difficult for a human operator to be present, such as another planet. Environment 100 may include one or more moving or stationary objects 120 located a particular distance from machine 110. For example, objects 120 may include landmarks, geological markers, trees, buildings, drills, pipelines, etc.

Machine 110 may embody a machine configured to perform some type of operation associated with an industry such as mining, construction, farming, transportation, power generation, or any other industry known in the art. For example, machine 110 may be an earth moving machine such as a haul truck, a dozer, a loader, a backhoe, an excavator, a motor grader, a wheel tractor scraper or any other earth moving machine. Alternatively, machine 110 may be a planetary exploration robot. Machine 110 may travel along a certain travel direction in environment 100. Machine 110 may also rotate or circle around a certain axis.

Machine 110 may include a motion estimation system 130 for estimating an ego motion of machine 110. "Ego motion", as used herein, refers to the three-dimensional (3D) motion of machine 110 relative to objects 120 within environment 100. The ego motion may have six parameters, three for translation velocities in x, y, z coordinates, and three for rotation angles (yaw, pitch, and roll), although any other coordinate system with different parameters may be used.

Motion estimation system 130 may include a scanning device 140 and a controller 150 connected to each other by a bus 160. While a bus architecture is shown in FIG. 1, any suitable architecture may be used, including any combination of wired and/or wireless networks. Additionally, such networks may be integrated into any local area network, wide area network, and/or the Internet.

Scanning device 140 may be mounted on a surface of machine 110 to sense objects 120 within a particular region that is scanned by scanning device 140. Scanning device 140 may be, for example, a LIDAR (light detection and ranging) device, a RADAR (radio detection and ranging) device, a SONAR (sound navigation and ranging) device, optical device such as a camera, or another device known in the art. In one example, scanning device 140 may include an emitter that emits a detection beam, and an associated receiver that receives any reflection of that detection beam. Based on characteristics of the received beam, scanning device 140 may generate scan data representing objects 120 within the particular region that is scanned by scanning device 140.

Motion estimation system 130 may also include other sensors such as, for example, accelerometers, gyroscopes, global positioning system (GPS) devices, radar devices, etc. These sensors may be used to measure, e.g., location, horizontal, vertical, and forward velocities and accelerations, inclination angle (e.g., pitch), inclination angular rate, heading, yaw rate, roll angle, roll rate, etc.

Controller 150 may receive scan data transmitted by scanning device 140, and determine an ego motion of machine 110 based on the scan data. Based on the determined ego motion, controller 150 may control movement of machine 110. Controller 150 may also control the scanning movement of scanning device 140.

Controller 150 may include processor 152, storage 154, and memory 156, included together in a single device and/or provided separately. Processor 152 may include one or more known processing devices, such as a microprocessor from the PENTIUM™ or XEON™ family manufactured by INTEL™, the TURION™ family manufactured by AMD™, or any other type of processor. Memory 156 may include one or more storage devices configured to store information used by controller 150 to perform certain functions related to disclosed embodiments. Storage 154 may include a volatile or non-volatile, magnetic, semiconductor, tape, optical, removable, nonremovable, or other type of storage device or computer-readable medium. Storage 154 may store programs and/or other information, such as information related to processing data received from scanning device 140, as discussed in greater detail below.

Figure 2:
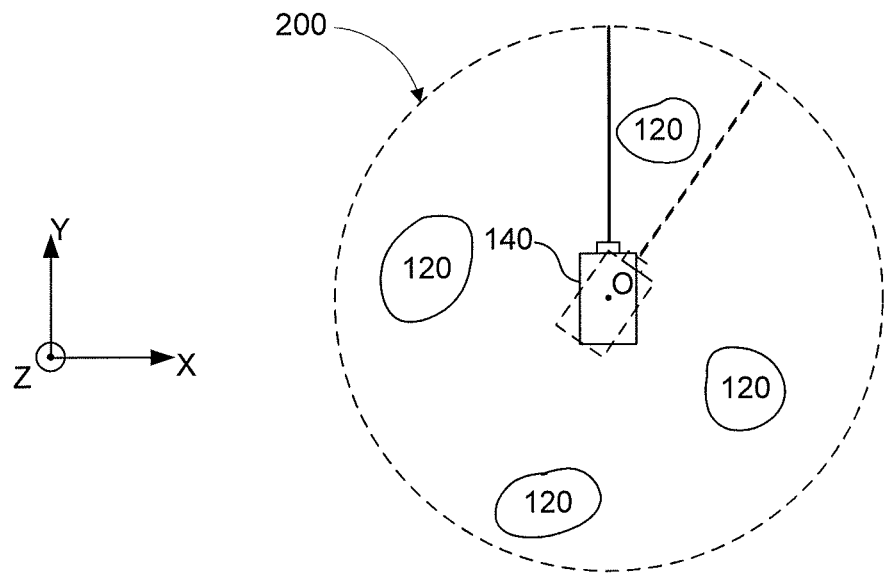
FIG. 2 is a schematic illustration of a scanning mechanism that may be included in the machine of FIG. 1.

FIG. 2 schematically illustrates a scanning mechanism of scanning device 140. In one embodiment, scanning device 140 may be configured to rotate about an axis O in 360 degrees to scan a full scanning region 200, which is shown as a circle having a center at scanning device 140. As it scans full scanning region 200, scanning device 140 may generate scan data representing objects 120 within the 360 degrees of full scanning region 200, and transmit the scan data to controller 150. Based on the scan data, controller 150 may generate a first pointcloud. A "pointcloud", as used herein, is a 3D pointcloud that includes a plurality of data points. Each data point within the first pointcloud may correspond to a 3D coordinate, such as (x, y, z), of one of a plurality of surface points of objects 120 within full scanning region 200 relative to scanning device 140. Thus, the first pointcloud may be a representation of the environment around machine 110 within full scanning region 200. In some embodiments, scanning device 140 may generate the pointcloud by itself, and output the generated pointcloud to controller 150.

While the embodiment of FIG. 2 describes scanning device 140 as being rotatable about axis O, in other embodiments, scanning device 140 may be configured to scan full scanning region 200 without rotating. For example, when scanning device 140 includes a LIDAR device, one or more optical devices internal to or external to scanning device 140 may cause a laser beam to cover full scanning region 200 without the need for scanning device 140 itself to rotate about axis O. In another example, scanning device 140 may sweep back and forth to scan full scanning region 200. Moreover, while FIG. 2 illustrates that full scanning region 200 includes 360 degrees, the present disclosure is not so limited, and full scanning region 200 may be any portion of the 360 degrees, such as 180 degrees, 90 degrees, etc., based on the application of machine 110.

Because scanning device 140 is mounted to machine 110, it moves as machine 110 moves. As it moves, scanning device 140 may continuously generate scan data from full scanning region 200. However, because it is moving, the scan data from a subsequent scan of full scanning region 200 may differ from that of a previous scan on full scanning region 200. Thus, for example, if controller 150 generates a the second pointcloud representing a subsequent scan, it may differ from the first pointcloud. Controller 150 may compare the second pointcloud with the first pointcloud to estimate the ego motion of scanning device 140, and thereby estimate the ego motion of machine 110 on which scanning device 140 is mounted.

In some embodiments, controller 150 may derive a transformation matrix M for transforming the second pointcloud, which may be represented by matrix B, into a transformed pointcloud M×B such that a difference between the transformed pointcloud M×B and the first pointcloud does not exceed a threshold. For example, transformation matrix M may be derived to minimize an average difference between each one of the (x, y, z) coordinates of each data point in the transformed pointcloud M×B and its nearest point in the first pointcloud. To validate the transformation matrix M, the threshold may be implemented so that the minimized average difference is smaller than a threshold value such as, for example, 1 mm, or any other value determined, for example, based on the application of machine 110 and characteristics of objects 120 within environment 100. Transformation matrix M may be used to estimate the ego motion of machine 110. For example, transformation matric M may include one or more values representing an estimated change in position of machine 110 in one or more directions, such as along the x-, y-, or z-axes and/or an estimated change in the orientation of machine 110, such as a change in yaw, pitch, or roll angles. If the minimized average difference is still higher than the threshold, then a valid transformation matrix M could not be found between the first pointcloud and the second pointcloud. In such case, controller 150 could not estimate the ego motion of machine 110.

In certain embodiments, the first and second pointclouds generated by controller 150 may include tens of thousands or even millions of data points. The large number of data points may make it computationally expensive to calculate the ego motion of machine 110 using the entire set of data points . In addition, due to various mechanical constraints, a full scan of 360 degrees by scanning device 140 may take approximately 0.1 second. Thus, if controller 150 waits for the full scan to be completed before estimating the ego motion of machine 110, controller 150 may be limited to doing so at a frequency of approximately 10 Hz. In certain embodiments, such a frequency may not be high enough for properly controlling the movement of machine 110.

Figure 3:
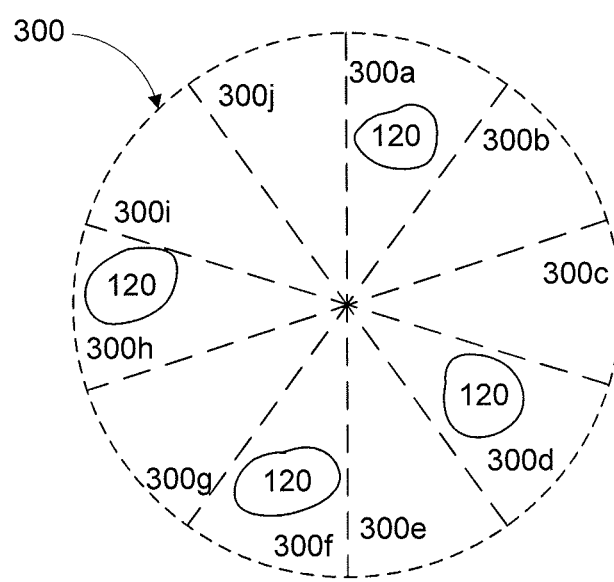
FIG. 3 is a schematic illustration of a method of motion estimation that may be performed by the machine of FIG. 1.

FIG. 3 schematically illustrates an exemplary method of motion estimation that may be performed by motion estimation system 130 to increase the frequency with which the ego motion of machine 110 may be determined and to reduce the computational requirements associated with doing so. In this embodiment, full scanning region 300 may be divided into N sub-scanning regions, wherein N is any integer greater than 1. In the exemplary embodiment as shown in FIG. 3, full scanning region 300 is divided into ten sub-scanning regions 300a-300j. Each one of sub-scanning regions 300a-300j is shown as a sector of full scanning region 300. Based on scan data received from scanning device 140 for each one of sub-scanning regions 300a-300j, controller 150 may generate a sub-pointcloud for each one of the ten sub-scanning regions 300a-300j. Controller 150 may compare each sub-pointcloud with a reference sub-pointcloud, and estimate the ego motion based on the comparison. A reference sub-pointcloud may be, for example, a sub-pointcloud determined based on a previous scan of scanning device 140 over a sub-region of full scanning region 300.

In this way, controller 150 does not have to wait for the full scan of 360 degrees to be completed in order to estimate the ego motion. Rather, controller 150 may estimate the ego motion after a scan over a sub-scanning region is completed, thus increasing the frequency at which controller 150 outputs an ego motion estimation by a factor of N, the number of sub-scanning regions contained within full scanning region 300. In addition, the number of data points in one sub-pointcloud is N times less than the number of data points in the full pointcloud. Therefore, the computational complexity for estimating the ego motion is also lowered, enabling faster calculations of the ego motion estimation.

Although FIG. 3 shows that full scanning region 300 is divided into N sub-scanning regions in the x-y plane defined by the rotational movement of scanning device 140, the present disclosure is not so limited. When scanning device 140 is a LiDAR device, it may project more than one, for example, 64, laser beams, and thus it may cover a three-dimensional full scanning region. In this case, the three-dimensional full scanning region may be divided into N sub-scanning regions vertically, e.g., in a z-direction that is perpendicular to the x-y plane. Alternatively, the full scanning region may first be divided into N sub-scanning regions in the x-y plane, and then each sub-scanning region may be further divided into M sub-scanning regions vertically. Therefore, the number of data points in each sub-pointcloud may be further reduced.

The reference sub-pointcloud may be selected among a plurality of reference sub-pointclouds. In some embodiments, the plurality of reference sub-pointclouds may be stored in storage 154. For example, scanning device 140 may scan over full scanning region 300 including sub-scanning regions 300a-300j, and controller 150 may generate and store sub-pointclouds for respective sub-scanning regions 300a-300j in storage 154 as the plurality of reference sub-pointclouds. The reference sub-pointclouds may be updated every time when a scan over the same sub-scanning region is performed.

Figure 4:
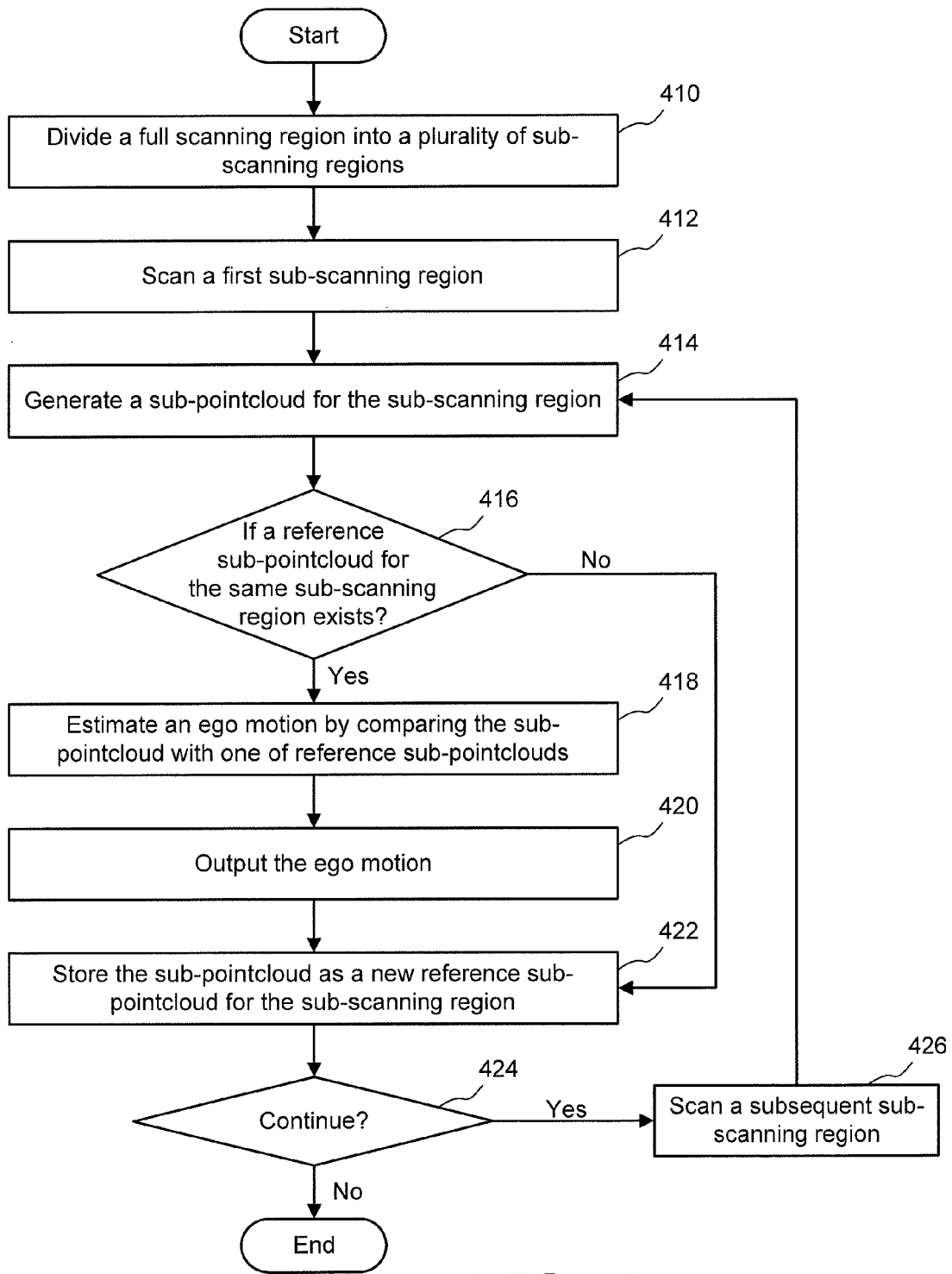
FIG. 4 is a flowchart depicting an exemplary method of motion estimation that may be performed by the machine of FIG. 1.

The operation of motion estimation system 130 will now be described in connection with the flowchart of FIG. 4. First, controller 150 may divide a full scanning region into a plurality of sub-scanning regions (step 410). For example, controller 150 may determine how to divide full scanning region 300 and the number N of the sub-scanning regions based on a user input, the size and characteristics of environment 100 (e.g., surface roughness, density of objects 120 within environment 100, etc.), the capabilities of processor 152, a speed of scanning device 140, a speed of machine 110, or any combination of the above.

Then, scanning device 140 may perform may scan a first sub-scanning region, e.g, sub-scanning region 300a (step 412). Scanning device 140 may transmit scan data obtained by the scan over sub-scanning region 300a to controller 150. Based on the scan data, controller 150 may generate a sub-pointcloud for sub-scanning region 300a (step 414). Alternatively, scanning device 140 may generate the sub-pointcloud by itself, and transmit the generated sub-pointcloud to controller 150. Then, controller 150 may determine whether a reference sub-pointcloud for the same sub-scanning region, i.e., sub-scanning region 300a, exists in storage 154 (step 416).

When scanning device 140 has previously scanned sub-scanning region 300a, a reference sub-pointcloud has been previously generated for scanned sub-scanning region 300a and stored in storage 154. In such case, controller 150 may determine that a reference sub-pointcloud for the same sub-scanning region exists in storage 154 (step 416, Yes), and then controller 150 may estimate an ego motion of machine 110 by comparing the sub-pointcloud with one of a plurality of reference sub-pointclouds stored in storage 154 (step 418). Controller 150 may output a signal representing the estimated ego motion (step 420). Controller 150 may also store the sub-pointcloud in storage 154 as a new reference sub-pointcloud for sub-scanning region 300a (step 422).

When scanning device 140 has not previously scanned sub-scanning region 300a, controller 150 may determine that a reference sub-pointcloud for sub-scanning region 300a does not exist in storage 154 (step 416, No). Then, the process may move directly to step 422 where the sub-pointcloud is stored as a new referenced sub-pointcloud for sub-scanning region 300a.

Afterwards, controller 150 may determine whether to continue the motion estimation (step 424). For example, controller 150 may check to see if a stop signal is received from an upper level controller, or from a user. When controller 150 determines that it should continue the motion estimation (step 424, Yes), controller 150 may instruct scanning device 140 to scan a subsequent sub-scanning region, i.e., sub-scanning region 300b (step 426). Then, the process may return to step 414 where a sub-pointcloud is generated based on the scan data obtained by the scan over sub-scanning region 300b. When controller 150 determines that it should not continue the motion estimation (step 424, No), the motion estimation process will end.

Controller 150 may select the reference sub-pointcloud among the plurality of reference sub-pointclouds stored in storage 154 based on a previously estimated motion of machine 110, the number of the sub-scanning regions, and/or a rotation speed of scanning device 140. For example, controller 150 may first determine linear velocities along the x-, y-, or z-axes, and angular velocities (yaw rate, roll rate, and pitch rate) of machine 110 based on a previously estimated motion of machine 110. Based on the linear velocities and the angular velocities of machine 110, and the rotation speed of scanning device 140, controller 150 may estimate the amount of displacement between a plurality of current sub-scanning regions covered by a current scan and a plurality of previous sub-scanning regions covered by a previous scan. Then, controller 150 may select a previous sub-scanning region that substantially overlaps with a current sub-scanning region, and select the reference sub-pointcloud corresponding to that previous sub-scanning region for estimating motion. "Substantially overlap", as used herein, refers to a situation in which the previous sub-scanning region has more than half of its area in common with the current sub-scanning region.

Figure 5:
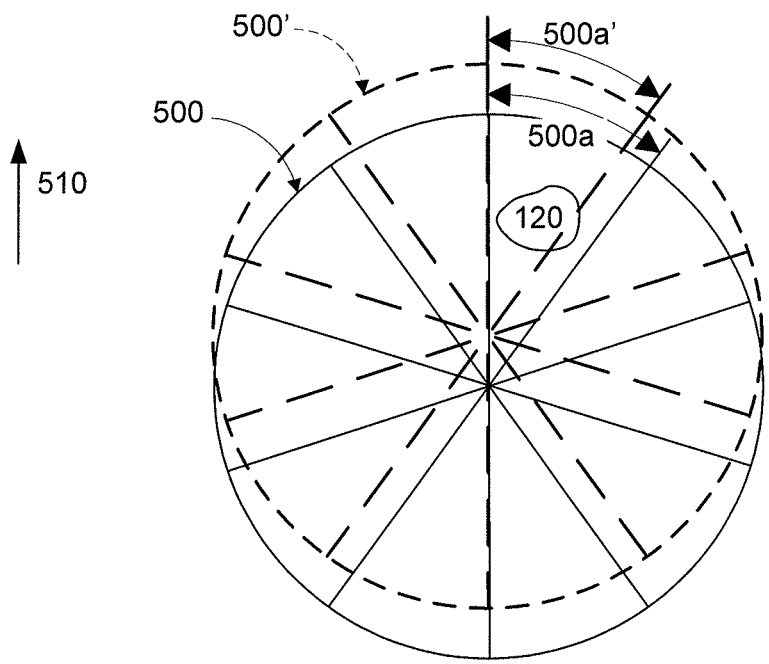
FIG. 5 is a schematic illustration of a method of motion estimation that may be performed by the machine of FIG. 1.

For example, machine 110 may be moving in a linear direction indicated by an arrow 510 in FIG. 5. A first scan by scanning device 140 may cover full scanning region 500 which may be divided into N sub-scanning regions starting with a sub-scanning region 500a. A second and subsequent scan by scanning device 140 may cover full scanning region 500' which may be divided into N sub-scanning regions starting with a sub-scanning region 500a'. Because the linear velocity of machine 110 is small, sub-scanning regions 500a and 500a' overlap with each other, and cover substantially the same object. Therefore, controller 150 may use a sub-pointcloud corresponding to sub-scanning region 500a as a reference sub-pointcloud, and compare a sub-pointcloud corresponding to sub-scanning region 500a' with the reference sub-pointcloud, to estimate the ego motion of machine 110.

In some embodiments, when the number N of sub-scanning regions exceeds a threshold value, and the velocity of machine 110 is large relative to the revolution rate of scanning device 140, the reference sub-pointcloud may be generated based on scan data obtained by a previous scan over a different sub-scanning region. For example, machine 110 may be rotating in a direction indicated by an arrow 610 in FIG. 6. A first scan by scanning device 140 may cover full scanning region 600 which may be divided into N sub-scanning regions starting with a sub-scanning region 600a. A second and subsequent scan by scanning device 140 may cover full scanning region 600' which may be divided into N sub-scanning regions starting with a sub-scanning region 600a'. Because the angular velocity of machine 110 is large, sub-scanning region 600a' does not overlap with sub-scanning region 600a. Rather, sub-scanning region 600a' substantially overlap with sub-scanning region 600c. Therefore, controller 150 use a sub-pointcloud corresponding to sub-scanning region 600c as a reference sub-pointcloud, and compare a sub-pointcloud corresponding to sub-scanning region 600a' with the reference sub-pointcloud to estimate the ego motion of machine 110.

In some embodiments, controller 150 may analyze the reference sub-pointclouds stored in storage 154 and the previously estimated ego motion, and instruct scanning device 140 to scan only a subset of the sub-scanning regions. For example, as shown in FIG. 5, at time t1, controller 150 may receive scan data from a scan over full scanning region 500 and may generate sub-pointclouds for each of the sub-scanning regions as the reference sub-pointclouds. By analyzing the reference sub-pointclouds, controller 150 may determine that object 120 is only present in sub-scanning region 500a. Additionally, by referring to the previously estimated ego motion, controller 150 may determine that machine 110 is moving in the linear direction indicated by arrow A. Therefore, controller 150 may instruct scanning device 140 to scan, at time t2, only sub-scanning region 500a', rather than the entire full scanning region 500.

Figure 6:
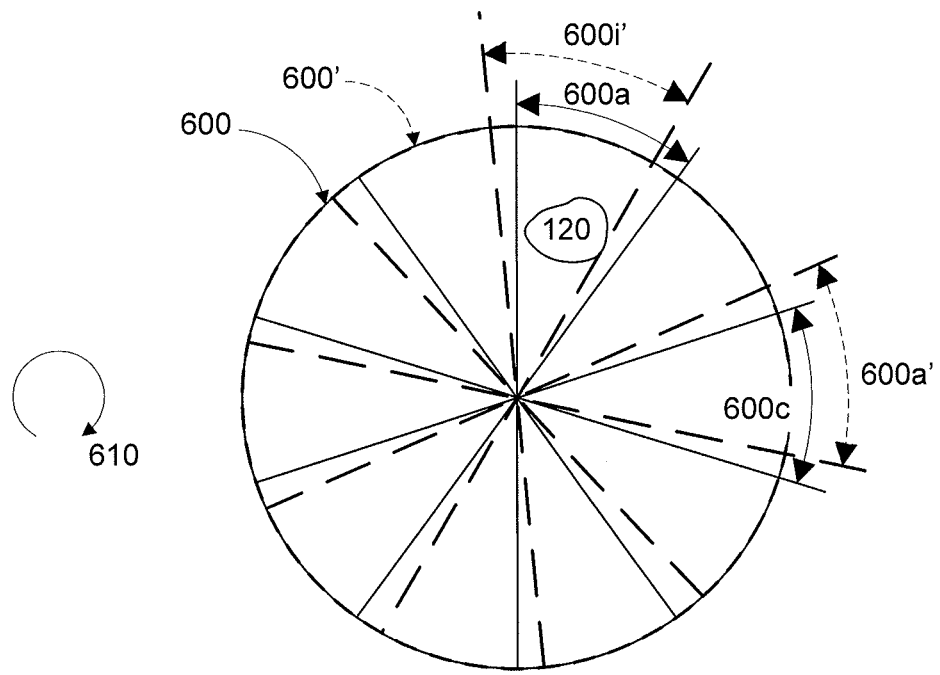
FIG. 6 is a schematic illustration of a method of motion estimation that may be performed by the machine of FIG. 1.

In another example, as shown in FIG. 6, at time t1, controller 150 may determine that object 120 is only present in sub-scanning region 600a. Controller 150 may also estimate that, based on the estimated ego motion of machine 110, sub-scanning region 600i' would correspond to sub-scanning region 600a. Then, controller 150 may instruct scanning device 140 to scan only sub-scanning region 600i' at time t2. In this way, computation resource and power required for motion estimation may be further reduced.

INDUSTRIAL APPLICABILITY

The disclosed motion estimation system 130 may be applicable to any machine where motion estimation is desired. According to the above embodiments, the disclosed motion estimation system 130 estimates the ego motion of machine 110 after scanning device 140 completes a scan over a sub-scanning region. Therefore, the disclosed motion estimation system 130 allows for a faster output rate of the ego motion.

In addition, the disclosed motion estimation system 130 estimates the ego motion of machine 110 based on data points contained in sub-pointclouds, the number of which is N times less than the number of data points in the full pointcloud. Therefore, the disclosed motion estimation system 130 allows for a lower computational requirement.

It will be apparent to those skilled in the art that various modifications and variations can be made to the disclosed motion estimation system. Other embodiments will be apparent to those skilled in the art from consideration of the specification and practice of the disclosed motion estimation system. It is intended that the specification and examples be considered as exemplary only, with a true scope being indicated by the following claims and their equivalents.

What is claimed is:

1. A system for estimating a motion of a machine, the system comprising:
   one or more memories storing instructions; and
   one or more processors configured to execute the instructions to:
      divide a full scanning region into a plurality of sub-scanning regions;
      receive, from a scanning device, first scan data representing at least one object obtained by a first scan over the full scanning region;
      generate, from the first scan data, a plurality of first sub-pointclouds for the plurality of sub-scanning regions included in the full scanning region;
      store the plurality of first sub-pointclouds as a plurality of reference sub-pointclouds in a storage device;
      receive, from the scanning device, second scan data representing the at least one object obtained by a second scan over less than the full scanning region and including at least one of the plurality of sub-scanning regions;
      generate, from the second scan data, a second sub-pointcloud, the second sub-pointcloud including a plurality of surface points of the at least one object in the sub-scanning region;
      select a reference sub-pointcloud among the plurality of reference sub-pointclouds obtained by the first scan;
      estimate the motion of the machine relative to the at least one object by comparing the second sub-pointcloud with the selected reference sub-pointcloud; and
      update at least one of the reference sub-pointclouds with the second sub-pointcloud.

2. The system of claim 1, wherein the one or more processors are further configured to derive a transformation matrix for transforming the sub-pointcloud into a transformed pointcloud such that a difference between the transformed pointcloud and the reference sub-pointcloud does not exceed a threshold, and estimate the motion of the machine based on the transformation matrix.

3. The system of claim 1, wherein the reference sub-pointcloud is selected such that the reference sub-pointcloud corresponds to a previous sub-scanning region covered by a previous scan and the previous sub-scanning region substantially overlaps with said one of the sub-scanning regions.

4. The system of claim 1, wherein
the full scanning region is a circle having a center at the scanning device, and
each sub-scanning region is a sector of the full scanning region.

5. The system of claim 1, wherein the one or more processors are further configured to:
generate a sub-pointcloud for each the plurality of sub-scanning regions, and
estimate the motion of the machine by comparing the sub-pointcloud for each sub-scanning region to a corresponding reference sub-pointcloud.

6. The system of claim 1, wherein the one or more processors are further configured:
receive, from the scanning device, initial scan data obtained by an initial scan over the plurality of sub-scanning regions;
generate, from the initial scan data, reference sub-pointclouds for the respective sub-scanning regions;
store the reference sub-pointclouds in a storage device; and
update at least one of the reference sub-pointclouds when scan data is received for the corresponding sub-scanning region.

7. The system of claim 6, wherein the one or more processors are further configured to analyze the reference sub-pointclouds and a previously estimated ego motion, and instruct the scanning device to scan a subset of the sub-scanning regions based on a result of the analysis.

8. The system of claim 1, wherein the sub-pointcloud includes three-dimensional coordinates information of at least a subset of points of the at least one object.

9. A computer-implemented method of estimating a motion of a machine, comprising:
dividing a full scanning region into a plurality of sub-scanning regions;
receiving, from a scanning device, first scan data representing at least one object obtained by a first scan over the full scanning region;
generating, from the first scan data, a plurality of sub-pointclouds for the plurality of sub-scanning regions included in the full scanning region;
storing the plurality of sub-pointclouds as a plurality of reference sub-pointclouds in a storage device;
receiving, from the scanning device, second scan data representing the at least one object obtained by a second scan over less than the full scanning region and including at least one of the plurality of sub-scanning regions;
generating, by a processor, a second sub-pointcloud from the second scan data, the second sub-pointcloud including a plurality of surface points of the at least one object in the sub-scanning region;
selecting, by the processor, a reference sub-pointcloud among the plurality of reference sub-pointclouds obtained by the first scan;
estimating, by the processor, the motion of the machine relative to the at least one object by comparing the second sub-pointcloud with the selected reference sub-pointcloud; and
updating at least one of the reference sub-pointclouds with the second sub-pointcloud.

10. The method of claim 9, further including:
deriving a transformation matrix for transforming the sub-pointcloud into a transformed pointcloud such that a difference between the transformed pointcloud and the reference sub-pointcloud does not exceed a threshold; and
estimating the motion of the machine based on the transformation matrix.

11. The method of claim 9, wherein the reference sub-pointcloud is selected such that the reference sub-pointcloud corresponds to a previous sub-scanning region covered by a previous scan and the previous sub-scanning region substantially overlaps with said one of the sub-scanning regions.

12. The method of claim 9, further including:
generating a sub-pointcloud for each one of the plurality of sub-scanning regions; and
estimating the motion of the machine relative to the at least one object based on the sub-pointcloud for each sub-scanning region.

13. The method of claim 9, further including:
receiving, from the scanning device, initial scan data obtained by an initial scan over the plurality of sub-scanning regions;
generating, from the initial scan data, reference sub-pointclouds for the respective sub-scanning regions;
storing the reference sub-pointclouds in a storage device; and
updating at least one of the reference sub-pointclouds when scan data is received for the corresponding sub-scanning region.

14. The method of claim 13, further including:
analyzing the reference sub-pointclouds and a previously estimated ego motion; and
instructing the scanning device to scan a subset of the sub-scanning regions based on the analysis result.

15. The method of claim 9, wherein the sub-pointcloud includes three-dimensional coordinates information of at least a subset of points of the at least one object.

16. A system, comprising:
a scanning device capable of being mounted on a machine and configured to:
scan at least one object over a full scanning region;
generate a plurality of first sub-pointclouds for a plurality of sub-scanning regions of the full scanning region;
scan the at least one object over a sub-scanning region less than the full scanning region and among the plurality of sub-scanning regions; and
generate a second sub-pointcloud of the sub-scanning region, the second sub-pointcloud including a plurality of surface points of the at least one object in the sub-scanning region; and
a controller configured to:
store the plurality first sub-pointclouds as a plurality of reference sub-pointclouds in a storage device;
select a reference sub-pointcloud among the plurality of reference sub-pointclouds;
estimate a motion of the machine relative to the at least one object by comparing the second sub-pointcloud with the selected reference sub-pointcloud; and
update at least one of the reference sub-pointclouds with the second sub-pointcloud.

17. The system of claim 16, wherein the scanning device is a light detection and ranging (LIDAR) unit that includes:
a light projecting unit configured to project a light beam to the at least one object and scan the light beam over the sub-scanning region; and
a photo sensing unit configured to sense a feedback light beam from the at least one object to generate the sub-pointcloud.

18. The system of claim 16, wherein:
the scanning device is further configured to scan the at least one object by rotating about an axis in 360 degrees,
the full scanning region is a circle having a center at the scanning device, and
each sub-scanning region is a sector of the full scanning region.

* * * * *